J. B. TAYLOR.
SOUND LOCATING DEVICE.
APPLICATION FILED APR. 12, 1909.
939,349.
Patented Nov. 9, 1909.
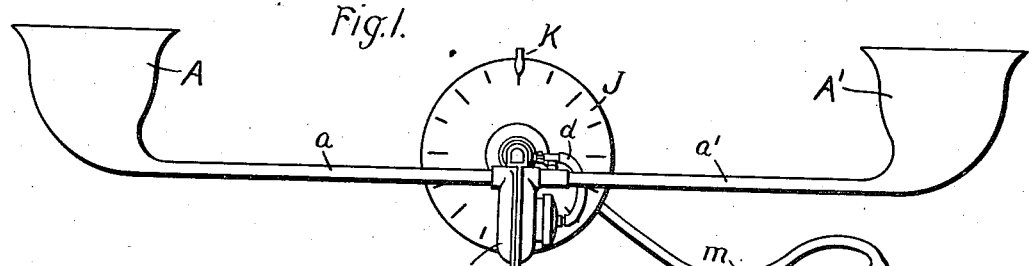
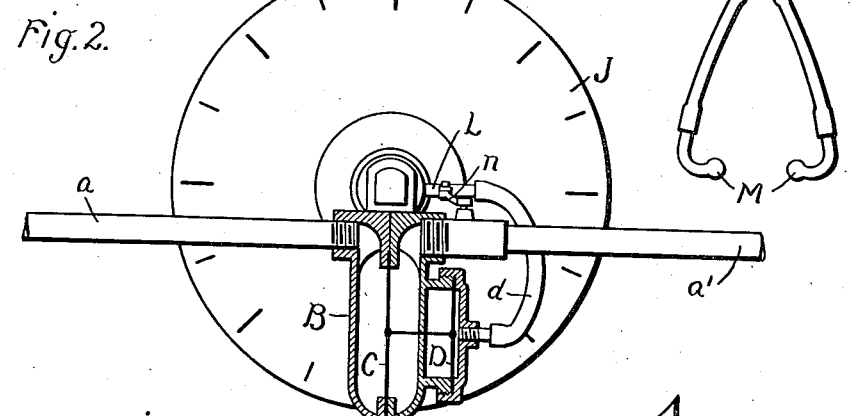
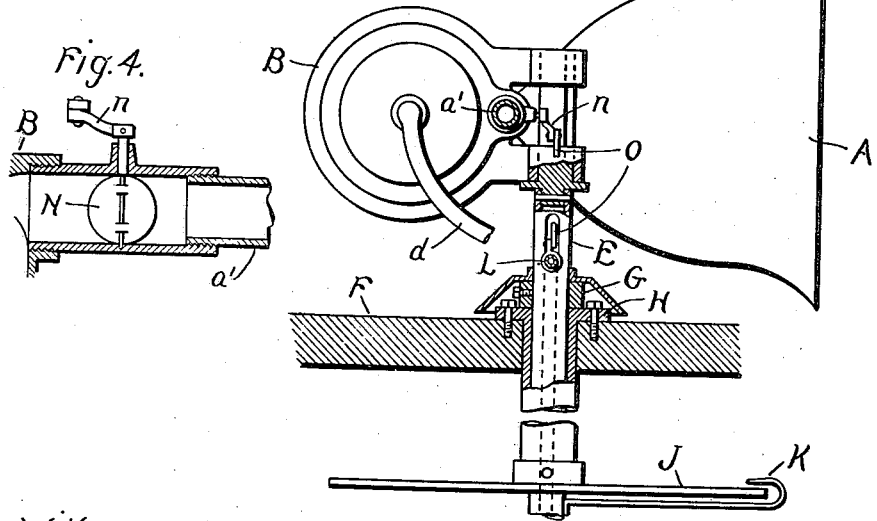
Witnesses
J. Ellis Glen.
J. Earl Ryan.
Inventor
John B. Taylor
by L. A. Hawkins
Atty.

UNITED STATES PATENT OFFICE.

JOHN B. TAYLOR, OF SCHENECTADY, NEW YORK.

SOUND-LOCATING DEVICE.

939,349.

Specification of Letters Patent.   Patented Nov. 9, 1909.

Application filed April 12, 1909.   Serial No. 489,494.

*To all whom it may concern:*

Be it known that I, JOHN B. TAYLOR, a citizen of the United States, residing at Schenectady, county of Schenectady, State of New York, have invented certain new and useful Improvements in Sound-Locating Devices, of which the following is a specification.

My invention relates to sound-locating devices such as have been proposed heretofore for use in navigating vessels in a fog, and its object is to provide a simple and reliable device of this character, which is more accurate than the devices heretofore proposed.

It has been proposed heretofore to employ a pair of separated sound-receivers with a common connection from both receivers to ear-tubes or other receiving devices, so that the effects of the sound-waves in the two receivers are cumulatively combined. The resultant is a maximum when the sound-waves in the two receivers are of exactly the same phase, so that when the maximum sound is heard, it indicates that the receivers are the same distance from the source of sound—that is, that the line joining them is normal to the direction in which the sound is coming. The operation of such a device depends upon determining the position in which the sound is a maximum. It is much more difficult to detect a variation in a loud noise than it is to detect the difference between a small sound and the absence of sound. I take advantage of this fact in my improved form of sound-locating device by providing a device subjected to the opposing effects of the sound-waves entering the two receivers, so that the sound-waves of the two receivers are combined differentially, and the position of the device in which the line joining the receivers is normal to the direction of the sound is that in which there is an entire absence of sound in the device.

For combining differentially the opposing effects of the sound-waves in the two receivers, I employ a diaphragm subjected on its opposite sides to the sound-waves in the two receivers. When the sounds entering the two receivers are of the same phase, the pressures on opposite sides of the diaphragm are exactly balanced, and no movement of the diaphragm results. A second diaphragm may be connected to the first, so as to be actuated by it, and connections carried from the second diaphragm to ear-tubes. In the operation of the device the sound-receivers are moved into the position in which no noise is heard. This position can be determined with great accuracy, and in this position the line joining the receivers is normal to the direction of sound.

In order to make sure that the absence of sound in the ear-tubes is due to a balance of sound, and not to the absence of sound to balance, I provide means for interrupting at will the connection from one or both of the sound-receivers to the diaphragm. When the receivers have been adjusted to the position of no-sound, the connection from one receiver to the diaphragm may thus be interrupted, when, if the sound continues, it will be at once audible, and the operator will know that the receivers are in the proper position.

My invention will best be understood by reference to the accompanying drawings, in which—

Figure 1 shows a plan view of a sound-locating device arranged in accordance with my invention; Fig. 2 shows an enlarged plan view, partly in cross-section, of a portion of the same; Fig. 3 shows an enlarged end view, partly in cross-section; and Fig. 4 shows a detail.

In the drawings A and $A^1$ represent a pair of horns which serve as sound-receivers, and which are separated from each other a suitable distance, and are connected by tubes $a$ and $a^1$ to a casing B, in which is a diaphragm C, which is subjected on its opposite sides to the effect of the sound-waves entering the two receivers. If the sound-waves are of exactly the same phase, no movement of the diaphragm C will be produced, but any difference in the phase of the sound-waves will produce a vibration of the diaphragm. This vibration may be transmitted by a second diaphragm D, which is connected to and actuated by the first diaphragm C. The sound-receivers and diaphragms are mounted on a vertical shaft E, which may extend downward through the roof of the pilot house, indicated at F. The shaft E carries a collar G supported on a bearing H on the pilot house roof, and also carries a hand-wheel I by means of which the shaft E may be rotated to swing the horns A and $A^1$ into different positions.

The bearing H is provided with a dial J, and the shaft E carries a pointer K, which extends perpendicularly to the line joining the horns, and indicates the direction in which the sound is coming. In order to transmit the indications from the pivotally-supported casing B to the operator, a tube $d$ connects the casing in which the diaphragm is placed with a tube L, which extends downward through the axis of the shaft E. From this tube a flexible tube $m$ may be carried to the ear-tubes M.

In order that the operator may determine whether the absence of sound in the ear-tubes is due to a proper setting of the device or to the cessation of the sound, a valve or valves may be inserted in the connections from one or both horns to the casing B. In the drawings such a valve or damper N is shown in the connection $a^1$ from the horn $A^1$ to the diaphragm C. This valve or damper is provided with a lever $n$ connected by the link O to the tube L, which extends through the axis of the shaft E. The shaft E is slotted where the tube L projects from the shaft, as shown in Fig. 3, so as to permit a vertical movement of the tube L within the shaft. A small handle or wheel P is placed at the lower end of tube L, so that it may readily be grasped by the operator in order to raise tube L and close the damper N, so as to cut off one horn from the diaphragm.

I do not desire to limit myself to the particular construction and arrangement of parts here shown, but aim in the appended claims to cover all modifications which are within the spirit and scope of my invention.

What I claim as new, and desire to secure by Letters Patent of the United States, is,—

1. A sound-locating device comprising a pair of separated sound-receivers, a device subjected to the opposing effects of the sound-waves entering the two receivers and responsive to the resultant of said opposing effects, and means for transmitting an indication proportional to said resultant.

2. A sound-locating device comprising a pair of separated sound-receivers, a diaphragm, connections from said receivers to opposite sides of said diaphragm, and a transmitter actuated by the movement of said diaphragm.

3. A sound-locating device comprising a pair of separated sound-receivers, a diaphragm, connections from said receivers to opposite sides of said diaphragm, and a transmitter comprising a second diaphragm connected to and actuated by the first.

4. A sound-locating device comprising a pivoted support, a pair of sound-receivers supported thereon a distance apart, a diaphragm carried by said support in symmetrical relation to said receivers, connections from said receivers to opposite sides of said diaphragm, and a transmitter actuated by the movement of said diaphragm.

5. In a sound-locating device comprising a pivoted support, a pair of sound-receivers supported thereon a distance apart, a diaphragm carried by said support in symmetrical relation to said receivers, connections from said receivers to opposite sides of said diaphragm, a transmitter comprising a second diaphragm connected to and actuated by the first, and a transmitting tube leading from the second diaphragm through the axis of the support.

6. A sound-locating device comprising a pair of separated sound-receivers, a device subjected to the opposing effects of the sound-waves entering the two receivers and responsive to the resultant of said opposing effects, means for transmitting an indication proportional to said resultant, and means for preventing, at will the sound-waves in a receiver from affecting said device.

7. A sound-locating device comprising a pair of separated sound-receivers, a diaphragm, connections from said receivers to opposite sides of said diaphragm, a transmitter actuated by the movement of said diaphragm, and means for interrupting at will the connection from a receiver to the diaphragm.

8. A sound-locating device comprising a pivoted support, a pair of sound-receivers supported thereon a distance apart, a diaphragm carried by said support in symmetrical relation to said receivers, connections from said receivers to opposite sides of said diaphragm, a transmitter actuated by the movement of said diaphragm, interrupting means in the connection from a receiver to the diaphragm, and means passing through the axis of said support for actuating said interrupting means.

In witness whereof, I have hereunto set my hand this 10th day of April. 1909.

JOHN B. TAYLOR.

Witnesses:
HEWLETT SCUDDER, Jr.,
L. A. HAWKINS.